Dec. 26, 1967  J. P. GIVRY ET AL  3,359,882
PLANT FOR HOUSING ELECTROLYTIC CELLS
Filed Oct. 7, 1966
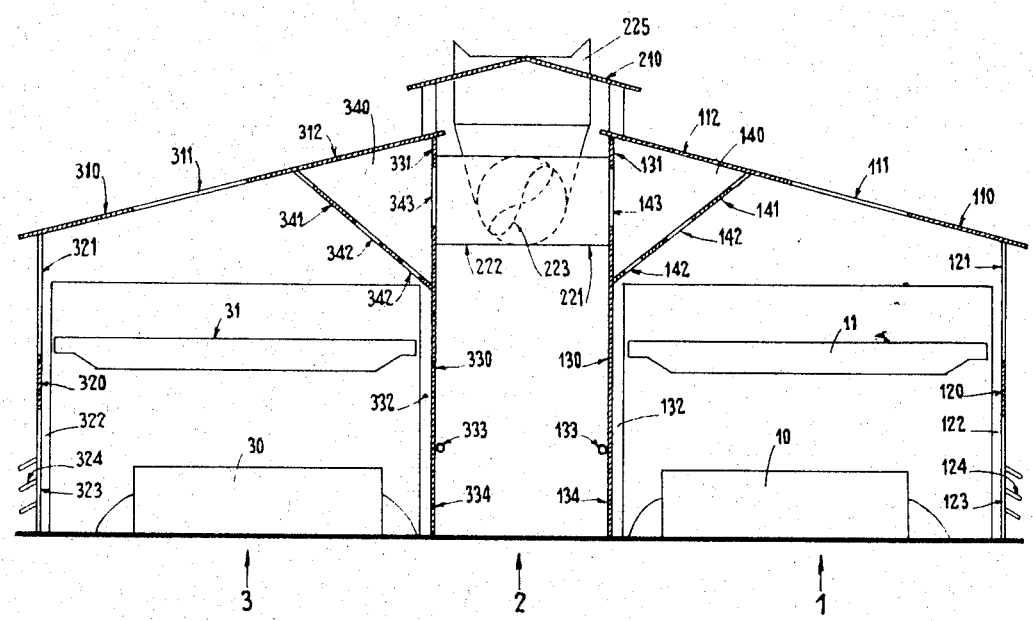

United States Patent Office

3,359,882
Patented Dec. 26, 1967

3,359,882
PLANT FOR HOUSING ELECTROLYTIC
CELLS
Jean Pierre Givry, Jacques Clair, and André Pailhiez,
Saint-Jean-de-Maurienne, and Robert Scalliet, Saint-
Cloud, France, assignors to Pechiney-Compagnie de
Produits Chimiques et Electrometallurgiques, Paris,
France
Filed Oct. 7, 1966, Ser. No. 585,139
Claims priority, application France, Oct. 14, 1965,
34,966
12 Claims. (Cl. 98—33)

This invention relates to the production of aluminum by electrolysis and relates more particularly to a vented building adapted for use in the production of aluminum.

The invention is addressed particularly, although not exclusively, to a construction in which the electrolytic cells, used in aluminum manufacture and the like, are arranged in groups with the groups lengthwise aligned in the building and with the cells crosswise aligned in the groups with the sides of longest dimension being arranged in side by side relation.

Furnaces or cells used in the production of aluminum by electrolysis give off considerably quantities of heat and vast amounts of gases and fumes, such as carbon dioxide, fluorine containing gases, tar distillation vapors and the like, by reason of the chemical reactions taking place within the cells. Dust particles in the form of alumina or other starting materials are entrained in the gases and fumes given off. It is therefore deemed desirable to ventilate the production facility for the protection of personnel from excessive temperatures, gases, fumes and dusts and to effect purification of the polluted air before discharge into the atmosphere.

The general conception for a building used in the production of aluminum by electrolysis should therefore be guided by factors such as overall dimension and capacity of the cells, their servicing facilities, surfaces and levels required for various jobs, circulation area, temporary storage area, ventilation, gaseous treatment and the like.

It is an object of this invention to produce a ventilated building adapted for the production of aluminum by electrolysis, in which all of the aforementioned factors have been taken into consideration, in which the structure is of simple and inexpensive construction, which provides considerable flexibility in operation, which embodies an efficient ventilation system, which enables the gases given off to be arrested without difficulty, and which provides a well ventilated building in which excessive temperatures are avoided and in which dusts and fumes are maintained at a minimum, in which the gases issuing to the atmosphere have been treated for purification to remove dusts and fumes before their release.

These and other objects and advantages of this invention will hereinafter appear and, for purposes of illustration, but not of limitation, an embodiment of the invention is shown in the accompanying drawing of a sectional elevational view in plan of a building embodying the features of this invention.

In accordance with the practice of this invention, the building comprises two rooms or shops symmetrically arranged on opposite sides of a central corridor. Each shop is arranged to accommodate one row of cells in which one row is referred to as the "down line" while the other is referred to as the "up line" of the stream. Each room or shop is constructed to embody such features as fresh air inlets in the lower portion of the outer walls with means for regulating the amount of air flowing into the room; means for withdrawing and processing polluted air from the room, including an intake passage having its inlet in the upper inner portion of the room bordering the corridor in which the passage is shaped in cross section somewhat in the form of a triangle the walls of which are defined by a portion of the roof, a portion of the corridor wall and an inclined baffle provided with a plurality of inlet openings. Withdrawal of polluted air from the rooms into the passage is adapted to be effected by means of fans or other gaseous displacement means located in the passage and preferably located in a header section extending lengthwise through the central corridor with openings communicating the corrider with the adjacent passages; and one or more purifiers communicating with the central corridor, and preferably at the level of the passages for treatment of the polluted air.

The aforementioned means include various features, such as the size and position of the fresh air inlets, the location of the baffles, the number and size as well as positions of the openings and the speed of the fans all of which depend somewhat on the width and height of the structure, the arrangement of cells and the amount of heat and gases given off by the cells. Accurate determination of the various specifications can be estimated by aerodynamic tests on a model.

Referring now to the drawing, illustration is made of a building having lengthwise extending, laterally spaced apart rooms or shops 1 and 3 which are symmetrical in arrangement on opposite sides of a central corridor or passageway 2.

Each room, such as room 1, accommodates the electrolytic cells 10 or their servicing or maintenance gear, such as the traveling bridge 11. Each room is formed with a sloping roof 110, having a portion 111 apertured to receive a window or other transparent or translucent panels to provide natural light during the daylight hours. An outside wall 120 extends upwardly to the outer end portion of the roof and is provided with windows 121 and the like for the penetration of daylight. An inner side wall 130 extends upwardly to an upper inner end portion of the sloping roof. The walls of the shop are preferably formed on a framework 122, 132 of metal, reinforced concrete or the like structural material.

For ventilation, the lower end portion of the outside wall 120 is provided with ports 123 for the inlet of outside air in amounts adapted to be controlled by shutter 124, with the shuttered ports extending from an area near ground level to a height which exceeds the height of a man or more than about six feet from the ground.

A passage or shaft 140 of triangular shape is provided in the upper inner end portion of the room as defined by the upper end portion 131 of the wall 130, the inner end portion 112 of the sloping roof 110 and an inclined baffle 141 formed with one or more intake openings 142 perpendicularly aligned with each tank or cell.

The position of the openings 142 enables the warm air rising naturally from the cells and the entrained gases and dusts to pass from the room into the shaft. To locate the openings 142 in a suitable position above the cells and to prevent the accumulation of dusts and dirt on the baffle, it is desirable to mount the baffle plate 141 in an inclined position at an angle within the range of 35° to 55°. The shaft 140 is preferably a continuation passage which extends lengthwise of the room, preferably without any internal partitions. The wall 131 is provided with a number of openings 143 for communicating the shaft with the hood 221 located in the upper portion of the central corridor. The openings 143 are located at regular intervals opposite the space between the adjacent cells.

Shop 3 is substantially the same as shop 1. Thus the description of shop 1 will also define shop 3, the numerals being the same except that the numeral 3 is substituted for the numeral 1 as the first figure such that the numeral 11 becomes 31, the numeral 121 becomes 321, etc.

The header formed of the hoods 221 and 222 is fitted with an exhaust fan 223 which draws air into the header through the passages 140 and 340 for delivery to a purification unit from which the purified air is exhausted to the atmosphere through the chimney 225. It is desirable to provide a number of fan-purification units for simultaineous use with predetermined number of cells in each of the shops, although a single purification system can be employed for the entire structure.

The fan and purification means are preferably located in the hoods arranged in the upper part of the central corridor, preferably at a level corresponding to the level of the passages 140 and 340 and they are supported on the framework. The portions of the central corridor 2 beneath the hood can be used for various purposes, such as for the handling of materials and the like. The corridor is provided with a roof or cover 210.

A building embodying the features of this invention has particular merit when the cells are arranged to extend crosswise of the building in lengthwise rows; that is, with their major lengths perpendicular to the alignment of the tanks. It is desirable to arrange the cells as close as possible to the inner wall 130 to leave a space therebetween and between adjacent cells which is sufficient for the maintenance of the cells.

The atmosphere to which the personnel is exposed is greatly improved. The free space between the cells and the outer wall 120 is supplied directly with fresh air. The fresh air remains channeled in the space between the cells while the dusts and gases issuing from the cells are directly entrained for upward transmission towards the intake shafts 140 and 340 instead of flowing laterally into the space between the cells. An average temperature which is only about 2° C. higher than the outside temperature is capable of being obtained in the space between the cell and the wall at levels as high as 1.5 meters from the ground. An average temperature which is only about 6° to 7° C. higher than the outisde temperature is capable of being obtained in the space between the cells at the same level.

In addition, the amount of fluorine can be held to less than 0.5 milligram per cubic meter throughout the entire normal working area, including the area between the cells.

It is desirable to have access to the cells from the inside adjacent wall 130 for carrying out maintenance work of substantial nature and/or long duration. For this purpose it is desirable to fabricate the lower portion of the wall 30, endwise of the cell, of panels 134 which are either in the form of removable panels or else panels which are provided with hinges 133 at their upper edge for rocking movement to a raised position whereby access can be had to the cells through the corridor. Under such circumstances, major overhauls can be carried out without interfering with normal operation of the plant.

The gas purifier may be of any known type, such as a spray washer, electrical precipitator, centrifugal separator, absorbable separator, and the like.

The building may be constructed of various materials such as prefabricated metal sheets, concrete and the like. It is possible to construct the building of metal or reinforced concrete framework 122, 132, 322, 332 strengthened by means of prefabricated metal or plastic members.

In addition to the ventilation and fume arresting units located in the upper part of the central corridor, the framework can also be used to support one or more silos for feeding alumina to the cells.

It will be understood that changes may be made in the details of the construction, arrangement, and operation without departing from the spirit of the invention, especially as defined in the following claims.

What is claimed is:

1. In an electrolysis plant having a plurality of electrolytic cells which give off heat, fumes and dust, a building for housing the cells comprising at least one cell shop in which the cells are arranged to extend crosswise of the shop in side by side spaced relation, a covered corridor adjacent the inner side of the shop, said shop being defined by an outer wall, an inner wall separating the shop from the corridor and a roof which slopes downwardly from the inner side to the outer wall, air inlet openings in the lower portion of the outer wall communicating the interior of the shop with the outside atmosphere, an air passageway in the upper inner portion of the shop between the roof and the inner shop wall and a baffle wall extending angularly between the roof and the wall spaced from the adjacent ends thereof, openings through the baffle wall communicating the interior of the shop with the passage for the passage of polluted air from the shop into the passageway, a hood extending lengthwise in the upper portion of the corridor adjacent the passageway, openings communicating the passageway with the hood for the passage of polluted air from the passageway into the hood, a washer communicating with the hood for the passage of polluted air from the passageway into the washer, an exhaust communicated with the washer for the passage of cleaned air from the washer to the atmosphere, and means in the hood for the displacement of air for the passage of air from the atmosphere into the shop and from the shop into the passageway and into the hood and from the hood through the washer into the atmosphere.

2. A plant as claimed in claim 1 in which the building is formed with a pair of shops spaced crosswise one from the other with the corridor in between and with the hood in the corridor communicating with the passageways on the opposite sides thereof.

3. A plant as claimed in claim 1 which includes shutters on the intake openings on the outer wall of the shop for regulating the inflow of air from the atmosphere.

4. A plant as claimed in claim 1 in which the intake openings extend upwardly from the adjacent ground level to a level above six feet.

5. A plant as claimed in claim 1 in which the passageway is of triangular shape.

6. A plant as claimed in claim 1 in which the baffle wall is positioned at an angle within the range of 35° to 55° with the horizontal.

7. A plant as claimed in claim 1 in which the openings in the baffle plate are crosswise aligned with the electrolytic cells.

8. A plant as claimed in claim 1 in which the inner ends of the cells are spaced a short distance from the inner wall of the shop.

9. A plant as claimed in claim 1 in which the inner wall is formed with displaceable panels in the lower end portion aligned crosswise with the cells for access to the cells from the corridor.

10. A plant as claimed in claim 9 in which the panels are removable panels.

11. A plant as claimed in claim 9 in which the panels are hinged along one edge for rocking movement between open and closed positions.

12. A plant as claimed in claim 1 in which the means for displacement of air through the hood comprises fans.

References Cited

UNITED STATES PATENTS 3,000,290    9/1961    Rodick et al. _____ 98—33
3,198,500    8/1965    Patrick _____ 98—33

LLOYD L. KING, *Primary Examiner.*